Aug. 30, 1949.  A. SIMMON  2,480,425
CONTRAST CONTROL DEVICE FOR PHOTOGRAPHIC ENLARGERS
Filed Jan. 30, 1948  4 Sheets-Sheet 1
Fig: 1
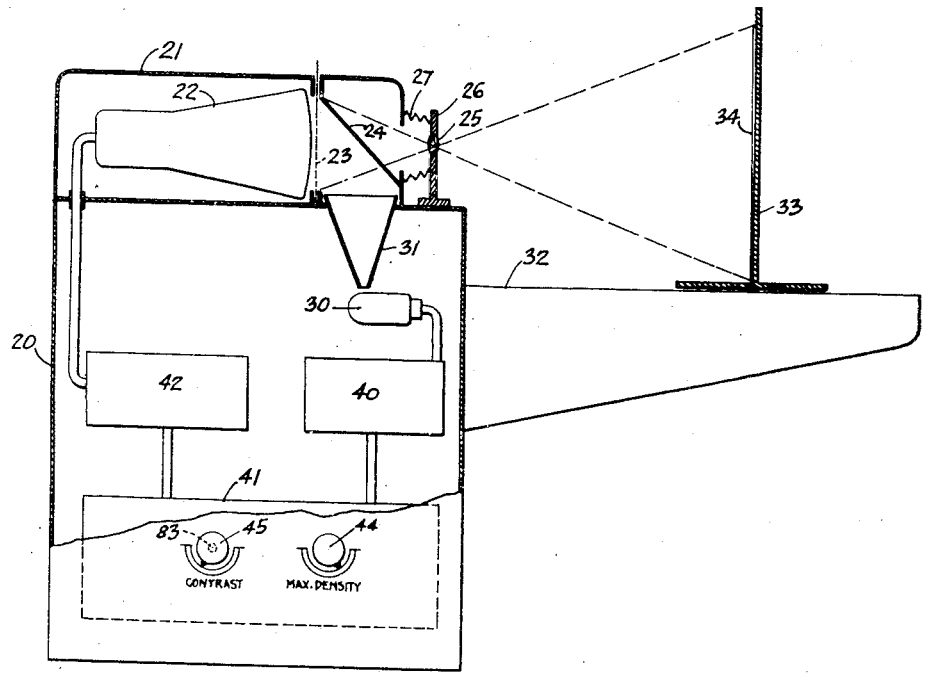
Fig: 3
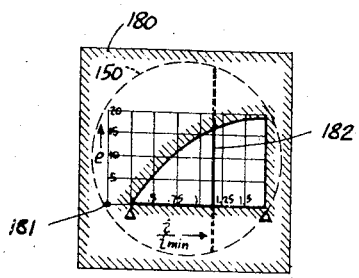
Alfred Simmon
INVENTOR.
BY Walter E. Wallheim
ATTORNEY.

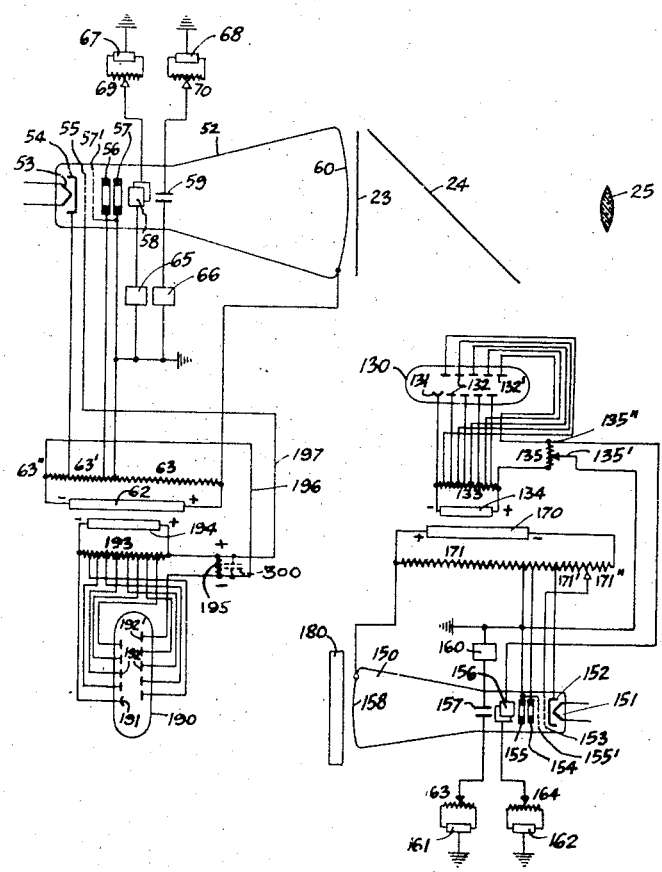
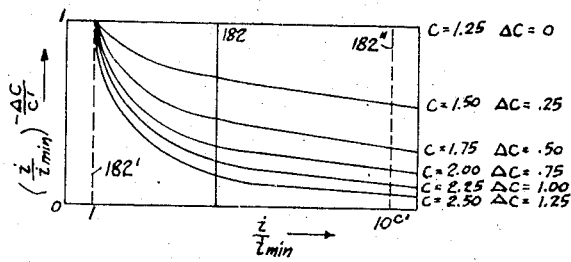

Aug. 30, 1949.  A. SIMMON  2,480,425
CONTRAST CONTROL DEVICE FOR PHOTOGRAPHIC ENLARGERS
Filed Jan. 30, 1948  4 Sheets-Sheet 3
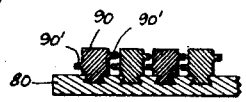
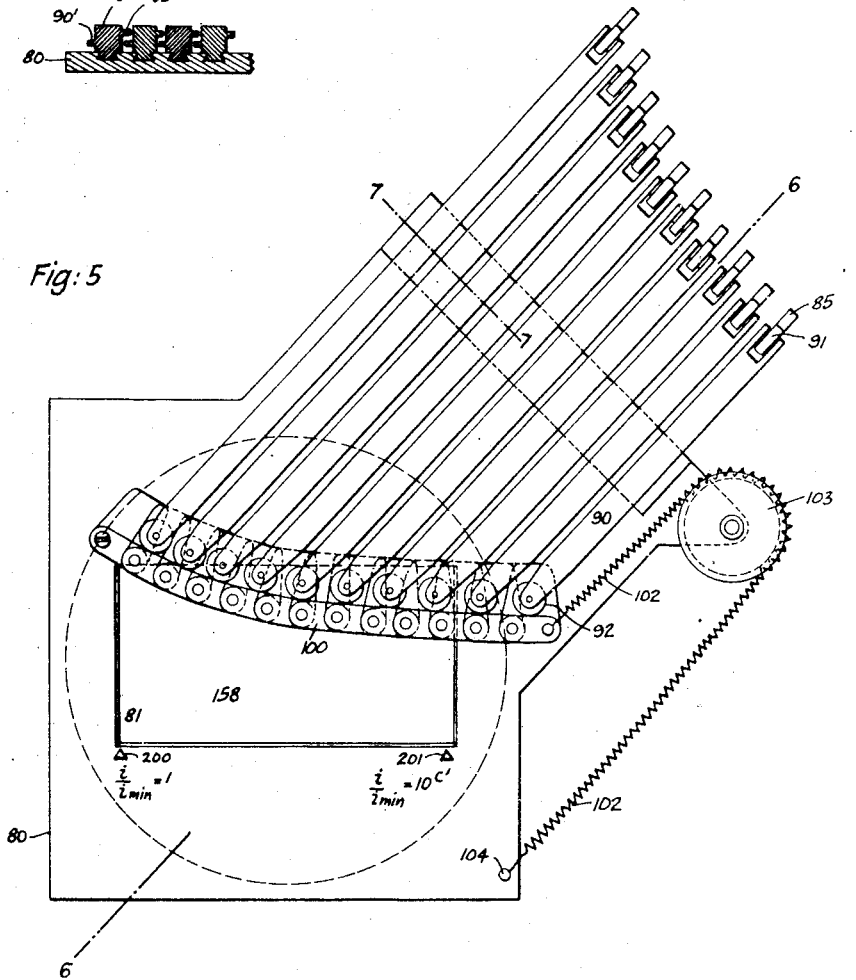
Alfred Simmon
INVENTOR.
BY Walter E. Wollheim
ATTORNEY.

Aug. 30, 1949.　　　　　A. SIMMON　　　　　2,480,425
CONTRAST CONTROL DEVICE FOR PHOTOGRAPHIC ENLARGERS
Filed Jan. 30, 1948　　　　　　　　　　　　　　4 Sheets-Sheet 4
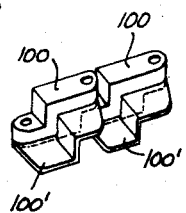
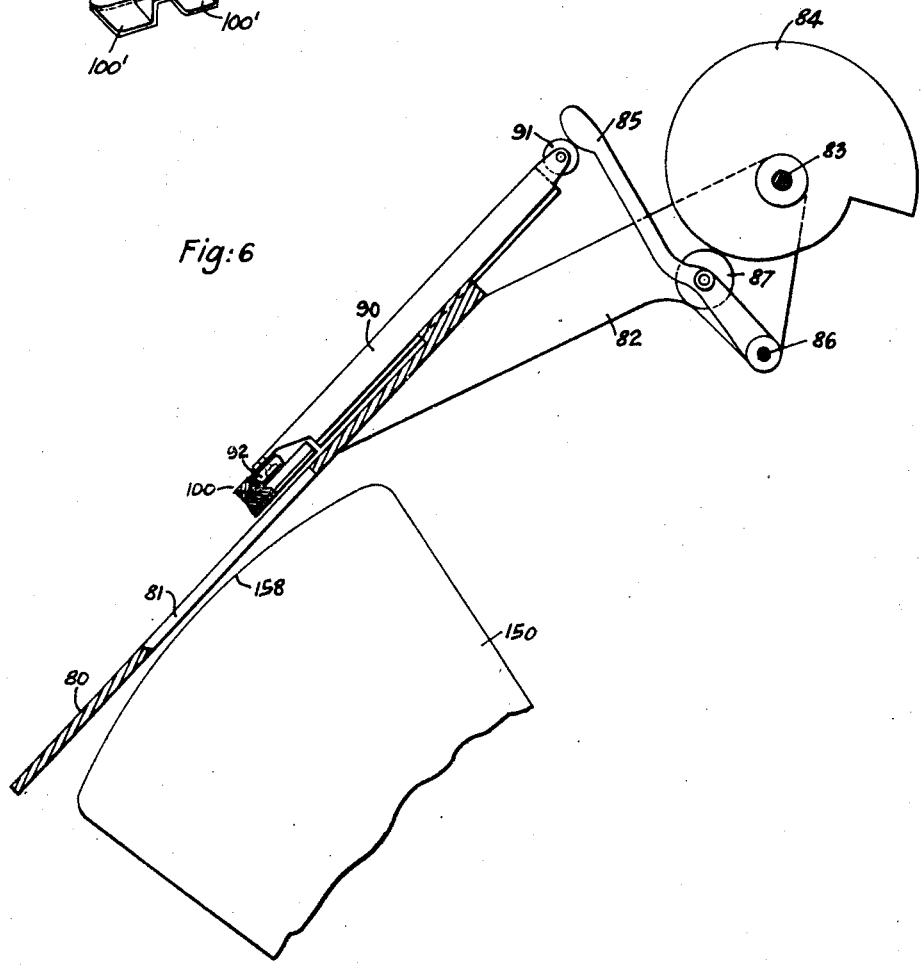
Alfred Simmon
INVENTOR.
BY Walter S. Wallheim
ATTORNEY.

Patented Aug. 30, 1949

2,480,425

UNITED STATES PATENT OFFICE 2,480,425

CONTRAST CONTROL DEVICE FOR PHOTOGRAPHIC ENLARGERS

Alfred Simmon, Jackson Heights, N. Y., assignor to Simmon Brothers, Inc., Long Island City, N. Y., a corporation of New York Application January 30, 1948, Serial No. 5,368

6 Claims. (Cl. 88—24)

It is well known that the contrast range of photographic negatives greatly exceeds the contrast range of photographic papers. In a contrasty photographic negative, details or density differences are sometimes distinguishable in parts which have a density of 3, i. e., which transmit $1/1000$ of the impinging light, but completely white and unexposed portions of a photographic paper will reflect at the most only 50 or 60 times the amount of light which is reflected by the fully exposed and completely black portions of the same paper. It is the object of this invention to provide in a photographic enlarger means by which the excessive contrast of a photographic negative or transparency can be reduced so as to match the available contrast range of a selected photographic paper.

Broadly, the device comprises in addition to the elements usually present in a photographic enlarger a cathode ray tube which produces on a screen in the usual manner a point of light which is made to scan the negative in a television like manner, means such as a semi-transparent reflector to project part of the light passing said negative into a photoelectric cell, and a modifying circuit which changes the photocell current according to a definite mathematical function into an output voltage which is then impressed as additional bias upon the control grid of the cathode ray tube, thereby modulating the brightness of said point of light and reducing all contrasts in a uniform ratio.

The invention is illustrated by means of the accompanying drawings embodying a preferred application of the principles of the invention.

Fig. 1 shows schematically a photographic enlarger equipped with a contrast reducing device according to this invention. The mechanical parts are shown in cross-sectional view, and the electric circuit is shown schematically;

Fig. 2 is a more detailed circuit diagram;

Fig. 3 is a mask which forms part of a modifying circuit;

Fig. 4 shows in a rectangular system of coordinates a family of curves which are used for the explanation of the modifying circuit;

Fig. 5 is an elevational view of an adjustable mask which forms part of the modifying circuit;

Fig. 6 is a sectional view along the plane of line 6—6 in Fig. 5;

Fig. 7 is a fragmentary cross sectional view along the plane of line 7—7 in Fig. 5; and Fig. 8 is a detail, in perspective, of the part of the mask.

In the interest of simplicity, voltage sources have in Fig. 2 been represented as batteries, but it will be understood that in reality, these batteries can be readily replaced in the usual manner by transformers, rectifiers and condensers. Since the circuits used are uniformly extremely sensitive to small voltage fluctuations, automatic voltage regulators or stabilizers must be used in this case in order to render all voltages substantially independent of small changes of line voltage. In the interest of clarity, these stabilizers as well as supply circuits for the various filaments for cathode ray and rectifying tubes have been omitted. These filaments are, in reality, either fed from small batteries or filament transformers.

General mechanical design

Referring to Fig. 1, a preferred embodiment of this device comprises a rectangular cabinet like base 20 which contains most of the electrical circuit elements. These elements are merely indicated schematically since their exact disposition within this cabinet is of no importance. Mounted on top of the cabinet is the projector with its housing 21 which contains a cathode ray tube 22, means to support a negative or transparency 23, and a semi-transparent mirror 24. Placed in front of the housing 21 and movable relative thereto for focusing purposes is a lens support 26 with a lens 25. A bellows 27 provides an extensible but light tight connection. A photoelectric cell 30 is mounted below the semi-transparent mirror 24, and a light collecting element 31 is preferably disposed between 24 and 30.

A bracket 32 is attached to the right side of cabinet 20 carrying a support 33 for a photographic paper 34 on which the print is made. This photographic paper is attached to the support 33 by means of spring clips or the like which, however, are not shown in the drawing. The support 33 can be shifted horizontally for the adjustment of the magnification ratio of the enlarger.

Within cabinet 20 there are, in addition to the photoelectrico cell 30, a supply circuit 40 for this cell, a modifying circuit 41 and a supply circuit 42 for the cathode ray tube which are in this view merely indicated by rectangles. Some elements of the modifying circuit 41 are adjustable in accordance with the maximum density and the contrast of the photographic negative, respectively, and these adjusting means terminate in handwheels 44 and 45 which protrude through the front panel of the cabinet 20 so as to be easily accessible to the operator. It will be understood that the device as shown is merely a preferred embodiment and, while in this instance the horipontal arrangement of the main light beam appears advantageous, this is not really necessary and the light beam may also be arranged in a vertical or any other direction if so desired.

Cathode ray tube and supply circuit

The cathode ray tube 22 is of substantially conventional design such as, for example, used in oscilloscopes or television receivers except that the screen should preferably be formed by a phosphor with negligibly short persistence, as will be explained in more detail at the end of this chapter. It comprises a glass vessel 52 which contains all other elements such as a filament 53, a cathode 54 heated thereby, and a control grid 55, two focusing members 56 and 57 including a second control grid 57', two pairs of deflection plates 58 and 59, respectively, and a screen 60 capable of light emittance.

The supply circuit operatively connected to this tube also does not depart from conventional design. It comprises substantially four parts, a filament circuit which is not shown, an acceleration and focusing circuit, a control grid circuit and the deflection circuits.

The acceleration and focusing circuit comprises a source of D. C., for example, a battery 62 connected to a potentiometer 63. The various points of this potentiometer are, respectively, connected to the cathode 54, the two focusing members 56 and 57 and the screen 60, each of these elements having a positive potential with respect to the preceding one.

The control grid 55 always has a negative bias with respect to the cathode 54 which is necessary since otherwise the electrons emitted by the cathode cannot be correctly focused to a point upon the screen. The negative bias consists of two voltages, the first voltage being delivered by the extreme left portion of the potentiometer 63 between points 63' and 63'' and the second voltage being delivered by the photoelectric cell by means of the modifying circuit as will be described later. The two bias voltages are additive and the bias delivered by the extreme left end of potentiometer 63 represents the minimum that always will be impressed upon the control grid 55. A modification of this arrangement by which the second voltage is deducted from rather than added to the first one will be described later.

The two pairs of deflection plates 58 and 59 are, respectively, connected to two sweep circuits which comprise saw tooth wave generators 65 and 66. These saw tooth wave generators are of well known design and deflect the luminous point formed upon screen 60 with substantially constant velocities but with different frequencies and in different directions, or more precisely, in directions which are perpendicular to each other. The result of this arrangement is that the luminous spot formed upon screen 60 scans a predetermined area of that screen in a television like manner. Each of these two deflection circuits is biased, respectively, by means of a small battery 67 and 68 and a potentiometer 69 and 70. By means of these additional bias circuits the starting points of the two sweep circuits can be properly adjusted.

It is necessary to provide means to reduce the persistance of the light emission of the screen of the cathode ray tube to a negligible magnitude. These means may be either associated with the tube itself, or they may be associated with the circuit.

Tubes are now commerciably available which have a phosphor with a spectral emission predominantly in the blue-green and the ultra violet region, and some of these screens have extremely short persistence. This characteristic can be further improved by a filter which absorbs the visible rays and transmits substantially the ultra violet only. Since the absorption characteristics of an ordinary photographic negative for ultra violet are not noticeably different from the absorption characteristics for visible rays, the use of ultra violet instead of visible rays for this purpose is not objectionable. Tubes of this type are commercially available, for example type 5WP15, Radio Corporation of America. These tubes are sometimes called "flying spot" cathode ray tubes and are used to scan a photographic transparency such as a moving picture film for the purpose of transmitting moving pictures by television. For a more complete description of this tube, reference is made to the technical information sheet issued by the Radio Corporation of America on this tube on January 15, 1948.

The use of tubes with a short persistence screen is desirable, but not strictly necessary, because the undesirable effect of persistence can also be eliminated by other means. It must be kept in mind that the absolute length of time of this persistence is not important, but only its ratio to the scanning speed of the light spot. For this particular application we are not at all forced to scan the picture with speeds customary in television work, but we can slow the scanning speed down as much as necessary. For example, whereas 30 frames per second are customary in television work, we may scan as slowly as one frame per second, or even one frame in ten seconds. This does not in any way affect the exposure times, because the integrated light energy falling upon any individual point of the print is, of course, independent of the scanning speed. Therefore, time lags which would be quite objectionable at television speeds will be negligible as soon as the scanning speed is reduced accordingly.

While the two expedients mentioned up to this point are the simplest, there exists still another means which comprises the introduction of equalizing networks, preferably of the resistance-capitance type, with suitable time constants into what in television work would be called the videoamplifier. Networks of this type have not been shown in the appended drawings, since they form no part of this invention.

Beam splitting device

The negative or transparency 23 is arranged in front of the cathode ray tube 22 and the semi-transparent mirror 24 arranged under an angle of substantially 45° is mounted in front of the transparency.

This semi-transparent mirror may be of the conventional type which consists of a thin layer of silver or some other metal on glass, but it may be a so-called dichroic reflector which comprises a plurality of thin films made, for example, from zinc sulfide coated on a transparent support. Interferences occur between the incoming and the reflected light beams and by choosing the interference films of the proper thickness and of a material with a suitable coefficient of refraction the light beam can be split in such a way that it is partly reflected and partly transmitted. The optical efficiency of dichroic semi-transparent reflectors is superior to the efficiency of the former type.

Mounted below the reflector 24 is preferably, but not necessarily, the light collecting element 31 which directs most of the reflected light into the photoelectric cell. It can be seen that due to the large dimensions of the screen 60, this light collecting element cannot be a lens. Suitable shapes are, for example, a truncated pyramid or a truncated cone with internal reflecting surfaces. It is also possible to use a truncated pyramid or cone made from glass or from a transparent plastic material, whereby the light is directed towards the photoelectric cell by total reflection.

The optical distance of the photoelectric cell 30 from the beam 60 must, of course, be so large that all points of the screen have substantially the same distance from the cell.

Photoelectric cell and supply circuit

The photoelectric cell 30 may be of any desired type known to the art, but in practice I prefer the so called photoelectric multiplier since additional amplifiers are usually unnecessary with this type of tube. Referring to Fig. 2, a typical cell of this type comprises a glass vessel 130, a photo sensitive cathode 131 and nine additional electrodes 132. The cathode 131 and the nine electrodes 132 are connected to respective points of a potentiometer 133 upon which a voltage is impressed by a battery 134 or other source of voltage. The cathode 131 is connected to the most negative point at the extreme left of potentiometer 133 and a last electrode 132' is connected to the extreme right point of this potentiometer receiving the most positive potential.

The wire connecting 132' to the right end of potentiometer 133 is interrupted and a resistor 135 is inserted in this circuit. A sliding contact 135' is operating on this resistor and the voltage impressed upon the upper portion of 135, i. e., between points 135'' and 135' is fed into the modifying circuit to be described in the next paragraph. The voltage between 135'' and 135' depends, therefore, upon the current circulating in the last loop of the photoelectric multiplier circuit and upon the resistance between points 135'' and 135'.

In reality, resistor 135 will preferably be of cylindrical shape and the rotatable contact 135' will be in electrical contact with it. This contact will be mounted on a shaft which terminates in the handwheel 44 which has already been shown in Fig. 1.

Modifying circuit—Mathematical relations

The photocell output current or, more specifically, the voltage impressed upon a part of resistance 135 between points 135' and 135'' is fed into a modifying circuit. The output voltage of this circuit is then impressed upon the grid 55 of the cathode ray tube and used there to modulate the brightness of the luminous spot formed on the screen in such a way that all contrasts are reduced in a uniform proportion. The modifying circuit must, therefore, deliver an output voltage which is a definite mathematical function of the input current or voltage. This mathematical function will be derived in the following paragraph and for reasons which will become apparent later, various currents, voltages and light intensities will be expressed under two assumptions; first, that the brightness of the luminous spot of the cathode ray tube is constant, i. e., unmodulated by the photocell current, and second, that the brightness of this spot is modulated in accordance with the output voltage of the modifying circuit.

With unmodulated light, the current passing the cathode ray tube is, of course, constant, equalling the maximum permissible current, i. e., $$I = I_{max} \quad (1a)$$

With modulation, however, the cathode ray tube current becomes a function of the additional bias voltage delivered by the modifying circuit, and this relation can be expressed within certain limits by the formula $$I' = I_{max} - ae \quad (1b)$$

$I$ and $I'$ are the respective currents passing the cathode ray tube at any given instance and $I_{max}$ is the maximum permissible cathode ray tube current. This value may be determined either as a maximum current that the screen of the tube will withstand without deterioration, or it may be the maximum value for which the linear relationship between cathode ray tube current and grid bias still holds true, or it may be determined by any other convenient consideration. $I$, $I'$, $I_{max}$ are conveniently expressed in micro amps ($\mu a.$). $e$ is the additional negative voltage impressed upon the control grid 55 which is added to the voltage impressed upon this grid by the left end of potentiometer 63. In other words, the left end of potentiometer 63 imposes a certain constant minimum negative voltage upon the grid at all times, and the voltage $e$ is the output voltage of the modifying circuit which will be added. $e$ is expressed in volts. $a$ is a constant which depends upon the characteristics of the individual cathode ray tube and which has a dimension $$\frac{\mu a.}{volt}$$

The light intensity on screen 60, i. e., before the light has passed the negative, is again within reasonable limits directly proportional to the cathode ray tube current, and for the two contemplated cases of an unmodulated and a modulated tube, respectively, these light intensities are $$L_1 = bI \quad (2a)$$
$$L'_1 = bI' \quad (2b)$$

$L_1$ and $L'_1$ are expressed in foot candles or in corresponding metric units and $b$ is a constant again depending upon the characteristics of the cathode ray tube, measured in $$\frac{Foot\ candles}{\mu a.}$$

The light intensity at the film stage level, i. e., after the light has passed the transparency and again without and with modulation, respectively, is $$L_2 = L_1 \cdot 10^{-D} \quad (3a)$$
$$L'_2 = L'_1 \cdot 10^{-D} \quad (3b)$$

where D is the density of the photographic transparency at the point which, at any given distance, is illuminated by the luminous spot of the cathode ray tube.

The light intensity in the plane of the photo sensitive cathode 131 of the photoelectric cell 30 is proportional to $L_2$ and $L'_2$, respectively, but, of course, considerably smaller depending upon the distance between the two tubes, i. e., $$L_3 = dL_2 \quad (4a)$$
$$L'_3 = dL'_2 \quad (4b)$$

$d$ is a dimensionless constant.

Light values in the plane of the photographic paper 34 are, of course, proportional to $L_3$ and $L'_3$, respectively.

The photocell current is again within wide limits proportional to the light impinging upon the photoelectric cell. In this case, of course, the condition without modulation is of no interest since this case would obviously not require a photocell. With modulation the photocell current is $$i = f.L'_3 \quad (5)$$

where $f$ is a constant denoting the light sensitivity of the photoelectric cell in $$\frac{\mu a.}{\text{Foot candles}}$$

I shall now impose the condition that all contrasts in the modulated case shall become a uniform fraction of the corresponding contrasts in the unmodulated case. In mathematical language the contrast between the darkest point of the negative and a point of the density D is, without and with modulation, respectively, $$C_0 = \log L_3 - \log L_{3\,min} \quad (6a)$$
$$C'_0 = \log L'_3 - \log L'_{3\,min} \quad (6b)$$

Similarly, the contrast between the densest and the most transparent point of the transparency, without and with modulation, are $$C = \log L_{3\,max} - \log L_{3\,min} \quad (7a)$$
$$C' = \log L'_{3\,max} - \log L'_{3\,min} \quad (7b)$$

The two magnitudes C and C' are important since C represents the actual contrast of the negative and C' the desired contrast to which the actual contrast must be reduced in order to match the contrast range of a selected photographic paper. C' therefore denotes also the contrast range of said selected photographic paper.

The condition of uniform contrast reduction means that $$\frac{C'_0}{C_0} = \frac{C'}{C} \quad (8)$$

I shall also assume that the light passing the densest part of the negative shall not be affected by the modulation, i. e., $$L'_{3\,min} = L_{3\,min} \quad (9)$$

That this is a reasonable condition can easily be seen, for obviously the cathode ray tube current will increase when the luminous spot passes denser parts of the negative, and formula 9 merely means that the cathode ray tube current reaches the permissible maximum when the luminous spot is placed behind the densest part of the negative, i. e., $I'$ becomes $I_{max}$ for $D = D_{max}$.

From Equations 2, 3 and 4, I obtain $$L_3 = dbI_{max}.10^{-D}$$
$$L'_3 = dbI'.10^{-D}$$

For $D = D_{max}$, $L_3$ becomes $L_{3\,min}$ and $L'_3$ becomes $L_{3\,min}$, which as explained above, equals $L_{3\,min}$.

$$L_{3\,min} = L'_{3\,min} = dbI_{max}.10^{-D_{max}}$$

These values for $L_3$, $L'_3$ and $L_{3\,min}$ can be introduced into the expression for $C_0$ and $C'_0$.

$$C_0 = D_{max} - D$$

(which, incidentally, is self-evident).

$$C'_0 = (D_{max} - D) - (\log I_{max} - \log I')$$

With these values, Equation 8 becomes $$\frac{C'_0}{C_0} = \frac{C'}{C} = \frac{(D_{max} - D) - (\log I_{max} - \log I')}{(D_{max} - D)}$$

or $$\left(1 - \frac{C'}{C}\right)(D_{max} - D) = (\log I_{max} - \log I') \quad (A)$$

Equations 2b, 3b, 4b and 5 can be combined and solved for $I'$ $$I' = \frac{i}{fdb} \cdot 10^D \quad (B)$$

Equation 1b can be transformed to read $$ae = I_{max} - I' \quad (C)$$

Equation B is now introduced into Equation A and solved for $10^D$ $$10^D = \left(\frac{I_{max}.fdb}{i}\right)^{\frac{C}{C'}} . 10^{-D_{max}\left(\frac{C}{C'} - 1\right)}$$

This value is introduced into Equation B $$I' = I_{max}^{\frac{C}{C'}} \cdot \left(\frac{fdb}{i}\right)^{\frac{C}{C'} - 1} . 10^{-D_{max}\left(\frac{C}{C'} - 1\right)}$$

This value, in turn, is placed into Equation C which is then solved for $e$ $$e = \frac{I_{max}}{a}\left[1 - \left(\frac{I_{max}.fbd.10^{-D_{max}}}{i}\right)^{\frac{C}{C'} - 1}\right] \quad (10)$$

This equation can be simplified in two ways. First, there is $$I_{max}.fbd.10^{-D_{max}} = i_{min}$$

i. e., this expression is nothing but the minimum current passing the photocell which takes place when the luminous point of the cathode ray tube is placed behind the densest point of the negative. Second, we can set $C - C' = \Delta C$ (density difference), whereupon the exponent in Formula 10 becomes $$\frac{C}{C'} - 1 = \frac{C - C'}{C'} = \frac{\Delta C}{C'}$$

With these modifications, I have $$e = \frac{I_{max}}{a}\left[1 - \left(\frac{i}{i_{min}}\right)^{-\frac{\Delta C}{C'}}\right] \quad (11)$$

This is the mathematical function according to which the modifying circuit has to work, i. e., when the spot of the cathode ray tube passes the point on the negative with a density D, a photocell current $i$ will be generated which, by the modifying circuit will be changed into a voltage $e$ which is then impressed upon the control grid of the cathode ray tube.

*Modifying circuit—preferred design*

The design of the modifying circuit itself is basically of no importance and any circuit which will modify an input current into an output voltage according to Formula 11 will be satisfactory. Circuits of this type are frequently networks using at least one non-linear resistance or impedance element such as one of the so called semi-conductors or a device using a saturated iron core or one of the various types of vacuum tubes. A preferred modifying circuit, however, which is in many respects superior to these networks, has been disclosed in my co-pending application Serial No. 791,439 and will be described as a preferred example in the following:

A modifying circuit built accordingly consists of three principal parts, a cathode ray tube 150, a stationary mask 180 and a photoelectric cell 190. It is emphasized that the cathode ray tube 150 and the photoelectric cell 190 are in no way identical with elements 22 and 30 which have been described above. They are entirely independent therefrom and perform entirely different functions.

The broad principle of the modifying circuit is that in some suitable manner a luminous straight line is formed on the screen of the second cathode ray tube 150, that the incoming signal which in this case is the current passing the first photocell 30, is used to deflect this line in a direction at right angles to itself and that thereby, part of the light emitted by this line is cut off by the stationary mask which is placed in front of the luminous screen of tube 150. The light permitted to pass this mask is then made to impinge upon the second photoelectric cell 190 which forms part of the modifying circuit and not upon cell 30. The current passing this second photoelectric cell 190 or, more precisely, the corresponding voltage impressed upon a resistor of suitable magnitude is then supplied as additional bias to the control grid 55 of the original cathode ray tube 22 which scans the transparency in the manner described.

This circuit is shown in detail as the lower half of Fig. 2. The cathode ray tube 150 contains a filament 151, a cathode 152 heated thereby, a control grid 153, two focusing members 154 and 155 including a second control grid 155', two pairs of deflection plates 156 and 157, and a screen 158 capable of light emittance.

A luminous line can be formed upon this screen by any desired means, for example, by giving the focusing elements 154 and 155 a proper configuration. I prefer, however, to use a conventional cathode ray tube which forms a luminous point upon the screen which is transformed into a line by means of a linear sweep circuit 160 operatively connected to the deflection plates 157. This sweep circuit is a saw tooth wave generator of the customary type which has a frequency which is high compared to the frequency of the signal impressed upon the other pair of deflection plates. It can be seen that the other set of deflection plates 156 is operatively connected to resistance element 135 upon which a voltage proportional to the current passing the first photocell 30 is impressed. Both sets of deflection plates 157 and 156 are biased by batteries 161 and 162 which are connected, respectively, to potentiometers 163 and 164. By means of this arrangement, the starting points of the two sweep circuits connected to deflection plates 156 and 157 can be adjusted.

The rest of the supply circuit for the second cathode ray tube is conventional. It consists of a battery 170 and a potentiometer 171, the various points of which are connected to the elements within the cathode ray tube in such a way that the control grid 153 assumes a negative potential with respect to the cathode 152, but that 154 has a positive potential with respect to 152, 155 a positive potential with respect to 154, and finally 158 a positive potential with respect to 155.

In front of screen 158, and preferably immediately adjacent thereto, is a mask 180 which is also shown in Fig. 3. This mask has an aperture which directly represents the mathematical function expressed in Formula 11. The mask is a thin plate made of opaque material such as black paper and sheet metal, and its vertical width varies as a function of the horizontal distance from a point of reference 181 in accordance with Formula 11. For convenience, the lower borderline of this aperture is made a straight line, but this is not necessary and both the upper and lower borders may be curved as long as the vertical width of the aperture is the desired function of the horizontal distance from the point of reference 181. It can be seen that only that part of the light emitted by the luminous line 182, which is behind said aperture can pass and that the other parts which are shown in dotted lines above and below this portion are blocked off. The light impinging upon the second photoelectric cell 190 is, therefore, proportional to the length of that portion of line 182 which appears behind the aperture or is a direct function of the shape of said aperture, in other words, varies in accordance with Formula 11, provided the aperture is fabricated correctly.

The distance between photoelectric cell 190 and cathode ray tube 150 must, of course, be large enough so that all points of the luminous line have substantially the same distance from the photosensitive cathode to the photoelectric cell 190. This cell may again be of any desired design and I have again shown a photoelectric multiplier tube because then a complicated amplifier can be avoided. The cell again has a photosensitive cathode 191, and nine additional electrodes 192, the last one being called 192'. The supply circuit comprises a battery 194, and a potentiometer 193, the various points of which are, in the usual manner, connected, respectively, to elements 191 and 192. The wire between the extreme right point of potentiometer 193 and the last electrode 192' is interrupted to receive a resistance element 195. The voltage impressed upon this resistance element by the current passing it represents directly the value $e$ used in Formula 11. $e$ is then by means of two wires 196 and 197 fed back into the grid control of the first cathode ray tube 22, i. e., voltage $e$ is added to the constant negative bias which control grid 55 has with respect to cathode 54. In Fig. 2, the polarity of $e$ with respect to the fixed bias of 55 is shown reversed, for reasons which will be explained below.

If the luminous line upon the screen 158 of cathode ray tube 150 is formed in the preferred manner by a voltage of high frequency impressed by saw tooth wave generator 160 upon deflection plates 157, means must be provided to keep the output current or voltage of the photoelectric cell 190 from being modulated accordingly. This can be done simply by connecting a condenser 300, shown in dotted lines, of suitable magnitude across resistor 195, or a more complete filter formed in the usual manner of a network of capacitances and inductances can be connected in parallel with 195. A filter of this type has not been shown in detail since its design is well known and forms no part of this invention. If, however, the luminous line upon screen 158 is formed by other means, for example, by the proper configuration of the focusing elements 154 and 155, this filter means can be dispensed with.

As can be seen from Formula 11, the output voltage $e$ of the modifying circuit is a function of the input current $i$, but the function itself must be adjusted in accordance with the minimum photocell current $i_{min}$, the desired contrast $C'$ and the difference between the actual and the desired contrast $\Delta C$. In the interest of simplicity, it shall be assumed that the operator always uses the same paper so that $C'$ is constant. The minimum photocell current $i_{min}$ could then, for example, be computed by measuring the maximum density $D_{max}$ and, likewise, the actual contrast of the negative $C$ could be measured, and a mask which properly expresses the function of Equation 11 could then be chosen and placed in front of cathode ray tube 150. A device adapted to measure the maximum density and the contrast of a photographic negative automatically and rapidly has been disclosed in my co-pending application Serial No. 793,666. Since, obviously, a large number of masks would have to be kept on hand, this procedure is not very convenient and an improvement is possible in the following manner:

Equation 11 can be written as follows:

$$e = \frac{I_{max}}{a} - \frac{I_{max}}{a} \cdot \left(\frac{i}{i_{min}}\right)^{-\frac{\Delta C}{C'}} \quad (12)$$

The left term $$\frac{I_{max}}{a}$$

is a constant for a given cathode ray tube and can, therefore, simply be added to the constant negative bias impressed upon the control grid 55. In other words, the left portion of potentiometer 63 between points 63' and 63" will be made so large that it now includes $$\frac{I_{max}}{a}$$

The modifying circuit will then be adjusted not in accordance with the function of Equation 11, but in accordance with the right term of Equation 12 or $$e_1 = \frac{I_{max}}{a} \cdot \left(\frac{i}{i_{min}}\right)^{-\frac{\Delta C}{C'}} \quad (13)$$

Owing to the fact that the second term of Equation 12 is preceded by a minus sign, the polarity of the output voltage of the modifying circuit must now be reversed, i. e., $e_1$ must be deducted from the constant bias supplied by the left part of potentiometer 63, and in the circuit diagram of Fig. 2 the connecting wires 196 and 197 have been shown accordingly.

The mathematical function of the modifying circuit, as has already been explained, must for any given negative, be adjusted in accordance with the values of $i_{min}$ and $\Delta C$. This can be done in a number of ways, but I prefer the following which can best be explained with the aid of Fig. 4 which shows a family of curves representing $$\left(\frac{i}{i_{min}}\right)^{-\frac{\Delta C}{C'}}$$

as a function of $$\frac{i}{i_{min}}$$

$i$ can assume any value between $i_{min}$ and $i_{max}$. This means that the smallest value which $$\frac{i}{i_{min}}$$

can assume will be unity. The largest value of $$\frac{i}{i_{min}}$$

i. e.

$$\frac{i_{max}}{i_{min}}$$

can be computed from the Formulae 1 to 5, by substituting $D_{max}$ or $D_{min}$ respectively for $D$. The result is $$\frac{i_{max}}{i_{min}} = 10^{C'}$$

This can also be seen without any computation by considering the simple fact that the ratio of photocell currents must obviously be equal to the ration of the $10^{-D}$ values where $D$ in this case is the apparent density of the modulated picture. If I assume that the available photographic paper has a contrast range of $C' = 1.25$, the ratio $$\frac{i_{max}}{i_{min}}$$

becomes 18.75.

Now Fig. 4 has not merely a purely mathematical significance, but is open to a more direct physical interpretation since it may also represent the screen 156 of the cathode ray tube 150 of the modifying circuit. The various curves then represent configurations of masks which must be placed in front of this screen for the various values of $C$ or $\Delta C$. During operation, there appears on the screen the luminous vertical line 182 which is debected rapidly to the left or to the right in accordance with the photocell current of photocell 130. The extreme left position of this luminous line represents the minimum value of $$\frac{i}{i_{min}}$$

and the extreme right position represents the maximum value of $$\frac{i}{i_{min}}$$

These two positions have been shown in Fig. 4 by dotted lines 182' and 182", respectively. The circuit must now be adjusted so that the extreme left position of this luminous line coincides with the value of $$\frac{i}{i_{min}} = 1$$

and that the extreme right position coincides with the value $$\frac{i}{i_{min}} = 10^{C'}$$

The first adjustment is done by moving sliding contact 135' and the second adjustment is performed by choosing the proper configuration of the mask. The value $$\frac{i_{max}}{a}$$

which appears in Formula 13 can, of course, be taken into account in a number of ways, for example, by adjusting the brightness of the luminous line by means of the grid bias impressed upon 153 by moving contact 171".

In order to obviate the necessity of changing masks, the fixed mask shown in Fig. 3 is replaced by an adjustable mechanism shown in Figs. 5 and 6 which is adapted to represent a family of curves, depending upon the choice of $C$.

All parts of the mechanism are mounted on a supporting plate 80 which has a preferably rectangular aperture 81 which is again placed directly in front of the fluorescent screen 158 of the cathode ray tube 150. As can be seen in Fig. 6, two brackets 82 are attached to the frame 80 supporting a shaft 83 to which a number of generally spiral shaped cams 84 are attached. In the example shown, ten of these cams would be attached to shaft 83, but only one has been shown in Fig. 6 for the sake of clarity, and while the shape of all cams will be generally spiral shaped, they will not all have precisely the same shape, depending upon the nature of the function which it is desired to impress upon the electrical circuit. Each cam is in series with a lever 85 which swivels around a fixed pivot 86 and which carries a cam following roller 87. The front end of this lever is in operative contact with the upper end of a slidable member 90. Ten of these members are provided in the example shown in Fig. 5. In order to reduce friction, the upper ends of these members 90 carry rollers 91 and the lower ends carry other rollers 92. The two axes of rollers 91 and 92, respectively, are perpendicular to each other as can be noted from Fig. 6. Rollers 92, in turn, are in contact with members 100 which are linked together in a chainlike manner. One end of the chain formed by these links 100 is fixedly but rotatably attached to a pivot 101, and the other end is biased by a relatively long spring 102 which is led around a roller 103 and finally fixedly attached at a point 104 to frame 80. The manner in which slidable members 90 are supported by frame 80 is shown in Fig. 7 which is a cross-sectional view along the plane of line 7—7 in Fig. 5. The shape of the links 100 is again shown in a three dimensional representation in Fig. 8. Both slidable members 90 and chain links 100 are equipped with certain fins 90' and 100', respectively, which make it possible to move these elements relative to each other and still block the passage of light between them. The result of this arrangement is that the lower border of chain 100 in Fig. 5 becomes the upper boundary of the aperture of frame 80, replacing thereby the aperture of the fixed mask shown in Fig. 3.

By rotating cam shaft 83 with the ten cams 84, the operator can cause the ten slidable members 90 to assume higher or lower positions within their respective tracks and thereby the links of chain 100 to assume correspondingly different positions. If the configurations of the various cams 84 are chosen properly, the chain 100 will assume, depending upon the rotation of cam shaft 83, all possible shapes as shown in Fig. 4; for example, for $C=1.25$ the upper boundary of aperture in frame 80 is represented by a straight horizontal line, and any increase in C will simultaneously curve this line and move it in a downward direction until for $C=2.50$ the upper boundary of the aperture is given by the lowest curve shown in Fig. 4. The operator thereby has it in his power to adjust the function by which the current passing photocell 22 shall be modified within wide limits, depending upon the choice of the parameter C.

Operation

The operation of the device can be fully understood from the following:

The negative 23 is placed in front of the luminous screen 60 of the cathode ray tube 22, Fig. 1, and the device is connected to a power line. The operator then observes the screen 158 of the cathode ray tube 150 forming part of the modifying circuit. For this purpose, a window is left in the front wall of cabinet 20 so that the operator can conveniently observe this screen. This window, however, has not been shown in the drawing. The screen 158 is visible in Fig. 5, and during operation a vertically luminous line can be observed which rapidly is deflected horizontally, depending upon the optical resistance, negative density, met by the luminous point on screen 60 which scans the negative 23. This luminous line on screen 158 oscillates during the scanning process between an extreme left position corresponding to the minimum photocell current $i_{min}$, and an extreme right position corresponding to the maximum photocell current $i_{max}$. The operator then turns handwheel 44 which is operatively connected to the sliding contact 135' and adjusts thereby the extreme left position occupied by the oscillating luminous line on screen 158 until this extreme left position corresponds to $$\frac{i}{i_{min}}=1$$

The mathematical significance of this adjustment can be seen in Fig. 4 and for convenience, a mark 200 is placed on element 80, see Fig. 5, denoting this position. Another mark 201 denotes the position which corresponds to $$\frac{i}{i_{min}}=10^{C'}$$

The shape of the adjustable mask is then adjusted by means of handwheel 45 until the extreme right position of the oscillating luminous line on screen 158 corresponds with this last named mark. This means that the apparent contrast of the image C' has been adjusted to the desired value. In greater detail, what happens within the various circuits of the device is as follows:

Due to the co-action of the two linear sweep circuits 65 and 66 which are, respectively, connected to deflection plates 58 and 59, the luminous spot which is formed on screen 60 of cathode ray tube 22 by the electrons emitted by cathode 54 and focused by members 56 and 57, is caused to scan an area substantially as large as negative 23 in a television like manner.

The light originating in screen 60 and passing negative 23 falls upon the inclined semi-transparent mirror 24. A portion of the light passes this mirror and reaches the lens 25 which in a well known manner forms an enlarged image of the negative upon the sheet of photographic paper 34 fastened to the paper support 33.

The second portion of the light is reflected by the semi-transparent mirror downwardly and impinges upon the photocell 30 or, more precisely, upon the photo sensitive cathode 131. The effect of the light upon this cathode is increased by the action of the light collecting element 31 which, by repeated reflection on its walls, causes an increased amount of light to reach the photoelectric cell 30.

The brilliancy of the luminous spot formed on screen 60 depends upon the negative bias that control grid 55 assumes with respect to cathode 54. This bias comprises two parts, a fixed portion delivered by the left half of potentiometer 63 or, more precisely, by that part of the potentiometer between points 63' and 63", and another part which depends upon the current passing the photocell 30 and which is modified by the modifying circuit. The function of these circuits is as follows:

Light impinging upon the photosensitive cathode 131 of photocell 30 causes currents to circulate in the various loops formed between the electrodes 132 and the corresponding points of potentiometer 133. The current is, of course, strongest in the last loop, i. e. in the wire connecting the right terminal of potentiometer 133 to the last electrode 132'. This wire has been interrupted to accept a resistance element 135. A voltage proportional to the current passing within this last loop is, therefore, impressed upon the resistor 135. Part of this voltage, in turn, is introduced into the modifying circuit.

The preferred design of the modifying circuit comprises a second cathode ray tube 150, a mask 180 which, in the preferred design, is adjustable, and a second photoelectric tube 190. The linear sweep circuit 160 causes a luminous, deflectable, line to be formed on screen 158, and this line is deflected by the voltage impressed upon resistor 135 connected to the deflection plates 156. The light emitted by this luminous line which is permitted to pass mask 180 depends upon the width of the mask 180 at the place to which the luminous line is deflected at any given distance by the voltage of resistor 135.

This light impinges upon the cathode 191 of the second photoelectric cell 190, causing there in the usual manner currents to flow in the wires connecting the various electrodes 192 to the corresponding points of potentionmeter 193. The last wire connecting 192' to point 193' is interrupted for the resistor 195 causing a certain voltage to pile up on this resistor. A condenser 300, or a more elaborate filter system used in its place, filters out the A. C. component of the photocell current which has been formed as a consequence of the luminous line upon the screen 158 being formed by the movement of a luminous point by the saw-toothed wave generator voltage, which has been impressed upon the deflection plates 157. The voltage across resistor 195 is, of course, proportional to the light reaching the photocell 190 and represents, therefore, the correct function which must be introduced into the control circuit of the first cathode ray tube 22. In other words, the voltage across 195 is added or subtracted by means of wires 196 and 197 to the bias supplied by the left portion of potentiometer 63 between points 63' and 63''. In the preferred embodiment of the device, the output voltage of the modifying circuit, i. e., the voltage across resistance 195 is represented by Formula 13 and this voltage must, therefore, be deducted from the fixed bias delivered by the left part of potentiometer 63.

It can, therefore, be seen that by the co-action of the light reaching the photoelectric cell 130, the modifying circuit and the bias circuit for the control grid 55, the light of the luminous spot formed on screen 60 is automatically modulated as a function of the density of that point of the negative which, at any given instance, receives light from screen 60. With the mathematical functions derived in the above specifications, the brilliancy of the moving spot on screen 60 becomes a maximum behind the densest portion of the negative and decreases for more transparent parts of said negative. As long as the modifying circuit represents one of the mathematical functions derived in the above specifications, all contrasts of a given negative will be reduced proportionately, and the image projected upon the photographic paper 34 will, therefore, have precisely the same appearance as an image produced by a less contrasty negative. The degree of contrast reduction can be freely chosen and it is, of course, desirable to have the final contrast match the available contrast of the selected photographic paper.

It will be clear that many details mentioned in the above specifications can be freely changed without departing from the spirit of the invention. It has already been mentioned that the design of the modifying circuit as described is merely a preferred example and that it can be freely replaced by other circuits serving the same purpose. If a circuit as described is used, the adjustment which is performed by the sliding contact 135' may be replaced by a potentiometer which may be located between elements 134 and 133 and which thereby would change the supply voltage for the multiplier tube 130. This would have the advantage that a relatively slight movement of this new potentiometer would cover a very wide range of photocell sensitivities and, therefore, of $$\frac{i}{i_{min}}$$

values. Instead of making the adjustment for the factor $$\frac{I_{max}}{a}$$

by adjusting sliding contact 171'' the same result can be obtained by placing a potentiometer between elements 194 and 193, thereby changing the supply voltage and the light sensitivity of the photomultiplier 190. The same result can also be obtained by providing a sliding contact operating on resistor 195 in the same manner in which 135' operates on 135.

I am aware of the fact that suggestions have been made in the past to modify the character of photographic images by television like methods. These methods, however, invariably contemplated the production of the final image by a cathode ray tube or by some other point by point system, and the final image, therefore, had a resolution substantially equal to that obtainable by a television type cathode ray tube, which compares very unfavorably with the resolution obtained by purely photographic or optical means. With the device disclosed in the above specifications, this is no longer the case. The image projected by lens 25 upon paper support 33 is a true optical image of the negative 23. The screen 60 which is subjected to a point by point modulation merely assumes the role of an "unsharp mask." The utility of "unsharp masks" in the modification of photographic images has been previously recognized, and reference is made to a paper by J. C. Yule which appeared in the March 1945 issue of the Journal of the Photographic Society of America.

What I claim as new is:

1. In a photographic enlarger comprising a support for a negative, a lens and a support for a sheet of sensitized material, a contrast control device comprising a cathode ray tube including a control grid, a beam splitter, a photo electric cell, and supply circuits for said tube and said cell, including a fixed negative bias voltage impressed upon said grid, and including an operative connection between said photo cell and said grid, said connection comprising a modifying circuit adapted to change the current passing said cell into an output voltage substantially according to the formula $$e = A\left[1 - \left(\frac{i}{i_{min}}\right)^{-\frac{\Delta C}{C'}}\right]$$

where $e$ is said output voltage,
$i$ is said photo cell current,
$i_{min}$ is the minimum value thereof,
$A$ is a constant,
$C$ is the difference between the actual contrast of the transparency and the desired contrast,
$C'$ is the desired contrast, and means to modulate the light output of said cathode ray tube by adding said output voltage as additional negative bias to said aforementioned fixed grid bias, said beam splitter arranged on one and said cathode ray tube arranged on the other side of said negative and its support, whereby part of the light transmitted by said negative is, by said beam splitter, projected into said photocell, and whereby the remaining part of the light transmitted by said negative forms an image with the desired contrast upon said sensitized sheet.

2. In a photographic enlarger comprising a support for a negative, a lens and a support for a sheet of sensitized material, a contrast control device comprising a cathode ray tube including a control grid, a beam splitter, a photo electric cell, and supply circuits for said tube and said cell, including a fixed negative bias voltage impressed upon said grid, and including an operative connection between said photo cell and said grid, said connection comprising a modifying circuit adapted to change the current passing said cell into an output voltage substantially according to the formula $$e = A \cdot \left(\frac{i}{i_{min}}\right)^{-\frac{\Delta C}{C'}}$$

where $e$ is said output voltage,
$i$ is said photo cell current,
$i_{min}$ is the minimum value thereof,
$A$ is a constant,
$C$ is the difference between the actual contrast of the transparency and the desired contrast,
$C'$ is the desired contrast, and means to modulate the light output of said cathode ray tube by deducting said output voltage from said aforementioned fixed grid bias, said beam splitter arranged on one and said cathode ray tube arranged on the other side of said negative and its support, whereby part of the light transmitted by said negative is, by said beam splitter, projected into said photo cell, and whereby the remaining part of the light transmitted by said negative forms an image with the desired contrast upon said sensitized sheet.

3. A device according to claim 1, said modifying circuit comprising a second cathode ray tube, independent of said cathode ray tube named in claim 1, and equipped with a screen capable of light emittance, a supply circuit for said second cathode ray tube, including means to excite a straight line on said screen to light emittance, means to deflect said line substantially at right angles to itself in accordance with the strength of the current passing the photoelectric cell named in claim 1, an apertured mask made from opaque material placed in front of said screen, the width of said aperture in a direction substantially parallel to said light emitting line varying substantially according to the formula $$Y = F\left(1 - X^{-\frac{\Delta C}{C'}}\right)$$

where $Y$ is the width of said aperture, measured at the distance $X$ from a point of reference,
$F$ is a constant,
$\Delta C$ is the difference between the actual contrast of the transparency and the desired contrast,
$C'$ is the desired contrast, a second photoelectric cell, independent from said cell named in claim 1, placed in front of said screen of the second cathode ray tube, a supply circuit operatively connected to said photoelectric cell, causing a current to pass said cell in proportion to the width of said mask at the place to which said light emitting line is, at any given instance, deflected by the current passing the first photoelectric cell, and means to add a voltage proportional to the current passing said second photoelectric cell to said constant negative grid bias of said first cathode ray tube named in claim 1.

4. A device according to claim 2, said modifying circuit comprising a second cathode ray tube, independent of said cathode ray tube named in claim 2, and equipped with a screen capable of light emittance, a supply circuit for said second cathode ray tube, including means to excite a straight line on said screen to light emittance, means to deflect said line substantially at right angles to itself in accordance with the strength of the current passing the photoelectric cell named in claim 2, an apertured mask made from opaque material placed in front of said screen, the width of said aperture in a direction substantially parallel to said light emitting line varying substantially according to the formula $$Y = F \cdot (X)^{-\frac{\Delta C}{C'}}$$

where $Y$ is the width of said aperture, measured at the distance $X$ from a point of reference,
$F$ is a constant,
$\Delta C$ is the difference between the actual contrast of the transparency and the actual contrast,
$C'$ is the desired contrast, a second photoelectric cell, independent from said cell named in claim 2, placed in front of said screen of the second cathode ray tube, a supply circuit operatively connected to said second photoelectric cell, causing a current to pass said cell in proportion to the width of said mask at the place to which said light emitting line it, at any given instance, deflected by the current passing the first photoelectric cell, and means to deduct a voltage proportional to the current passing said second photoelectric cell from said constant negative grid bias of said first cathode ray tube named in claim 2.

5. A device according to claim 2, said modifying circuit comprising a second cathode ray tube, independent of said cathode ray tube named in claim 2, and equipped with a screen capable of light emittance, a supply circuit for said second cathode ray tube, including means to excite a straight line on said screen to light emittance, means to deflect said line substantially at right angles to itself in accordance with the strength of the current passing the photoelectric cell named in claim 2, an apertured mask made from opaque material placed in front of said screen, an adjustable mechanism adapted to alter the shape of the aperture of said mask, comprising an apertured frame, placed in front of the screen of the cathode ray tube and supporting the other elements of said mechanism, a plurality of movable cams, including means to move them in unison, a plurality of elongated members, each with two ends, said members adapted to slide in parallel tracks, a plurality of links, attached to each other and forming a chain adjacent to said aperture and covering part of it, and means, including spring biasing means operating on said links, adapted to establish operative contact between said chain and the first ends of said slidable members, and between the second ends of said slidable members and said cams, whereby more or less of the light passing width of said aperture is covered by said links and said members in accordnce with the positions into which said cams are placed by the operator relative to said members, a second photoelectric cell, independent from said cell named in claim 2, placed in front of said screen of the second cathode ray tube, a supply circuit operatively connected to said second photoelectric cell, causing a current to pass said cell in proportion to the width of said mask at the place to which said light emitting line is, at any given instance, deflected by the current passing the first photoelectric cell, and means to deduct a voltage proportional to the current passing said second photoelectric cell from said constant negative grid bias of said first cathode ray tube named in claim 2, whereby the light output of the first cathode ray tube is modulated in accordance with the formula given in claim 2, and whereby said modulation is adjusted as a function of $\Delta C$ and $C'$ by said mechanism adjusting the shape of the aperture of said mask.

6. A device according to claim 2, said modifying circuit comprising a second cathode ray tube, independent of said cathode ray tube named in claim 2, and equipped with a control grid and a screen capable of light emittance, a supply circuit for said second cathode ray tube, including means to excite a straight line on said screen to light emittance, means to deflect said line substantially at right angles to itself in accordance with the strength of the current passing the photoelectric cell named in claim 2, means under the control of the operator to adjust the strength of said current, an apertured mask made from opaque material placed in front of said screen, an adjustable mechanism adapted to alter the shape of the aperture of said mask, comprising an apertured frame, placed in front of the screen of the cathode ray tube and supporting the other elements of said mechanism, a plurality of movable cams, including means to move them in unison, a plurality of elongated members, each with two ends, said members adapted to slide in parallel tracks, a plurality of links, attached to each other and forming a chain adjacent to said aperture and covering part of it, and means, including spring biasing means operating on said links, adapted to establish operative contact between said chain and the first ends of said slidable members, and between the second ends of said slidable members and said cams, whereby more or less of the light passing width of said aperture is covered by said links and said members in accordance with the positions into which said cams are placed by the operator relative to said members, a second photoelectric cell, independent from said cell named in claim 2, placed in front of said screen of the second cathode ray tube, a supply circuit operatively connected to said second photoelectric cell, causing a current to pass said cell in proportion to the width of said mask at the place to which said line was, at any given instance, deflected by the current passing the first photoelectric cell, and means to deduct a voltage proportional to the current passing said second photoelectric cell from said constant negative grid bias of said first cathode ray tube named in claim 2, whereby the light output of the first cathode ray tube is modulated in accordance with the formula given in claim 2, and whereby said modulation is adjusted as a function of $i_{min}$ by adjusting the strength of the current fed into said modifying circuit, and as a function of $$\frac{\Delta C}{C'}$$

by adjusting the shape of said mask.

ALFRED SIMMON.

REFERENCES CITED

The following references are of record in the file of this patent:

UNITED STATES PATENTS

| Number | Name | Date |
|---|---|---|
| 2,214,072 | Biedermann | Sept. 10, 1940 |